Patented Sept. 21, 1943

2,329,701

UNITED STATES PATENT OFFICE 2,329,701

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application October 20, 1941, Serial No. 415,764

6 Claims. (Cl. 252—344)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The demulsifier or demulsifying agent employed in our process, consists of a quaternary compound of the pyridine series of the kind hereinafter described in detail. Members of the pyridine series suitable as reactants include pyridine, alkylated derivatives of pyridine, particularly alkylated derivatives in which the alkyl radical contains three carbon atoms or less, and especially methylated pyridines, i. e., pyridines in which one, two, or three methyl groups have been substituted in the nucleus, such as picolines, lutidines and collidines. Also suitable as reactants are the comparable quinolines and isoquinolines, along with C-methyl homologues thereof. Coal tar bases represent mixtures of suitable heterocyclic materials which may be used as such, or after suitable purification, without separation into the individual components.

Specifically, then, compounds herein contemplated as demulsifiers, consist of the quaternary nitrogen products obtained by reacting one mole of hydroxy compounds of the formula:

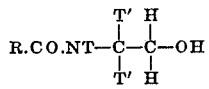

in which T is a member of the class consisting of hydrogen atoms and hydroxyethyl radicals, and T' is a member of the class consisting of hydrogen atoms, methyl radicals, ethyl radicals, and hydroxymethyl radicals, with the proviso that at least one occurrence of T' is a radical of the kind designated, as differentiated from a hydrogen atom; RCO denotes an acyl radical derived from a detergent-forming monocarboxy acid, with a heterocyclic compound of the pyridine, quinoline, isoquinoline series, and C-methyl homologs thereof, in the presence of substantially one mole of halogen hydride at an elevated temperature, the heterocyclic compound being applied in an amount substantially equivalent to the halogen hydride, and usually in excess thereof, i. e., the reaction being conducted in the presence of the free base.

It is well known that certain monocarboxy organic acids containing eight carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms, for instance, see U. S. Patent No. 2,242,837, dated May 20, 1941, to Shields.

As to a description of a somewhat analogous type of compound, see U. S. Patent No. 2,242,211, dated May 20, 1941, to Haack. See also our copending application for Patent Serial No. 401,375, filed July 7, 1941, which subsequently matured as U. S. Patent No. 2,273,181, dated February 17, 1942, to De Groote and Keiser.

Certain amines are available as raw materials, for the manufacture of amides employed as reactants in the manufacture of the demulsifiers or new compounds herein contemplated. It is well known that paraffins can be treated with nitric acid, so as to produce nitroparaffins or nitrites. Such nitroparaffins can be treated with aldehydes, particularly aliphatic aldehydes, having four carbon atoms, or less, so as to produce nitroparaffins in which 1, 2, or 3 hydroxyl alkyl radicals have been introduced, and particularly, characterized by the fact that such nitro-paraffins may have two or three alkylol groups attached to the same carbon atom. Such nitroparaffins can readily be converted into the corresponding amine. See "Chemical Industries," volume 45, No. 7, pages 664–668, December 1939. See also "Industrial and Engineering Chemistry," volume 32, No. 1, page 34.

Well known examples of amines of the kind described are:

2-amino-1-butanol

2-amino-2-methyl-1-propanol

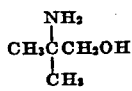

2-amino-2-methyl-1,3-propanediol

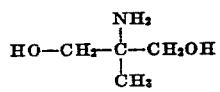

2-amino-2-ethyl-1,3-propanediol

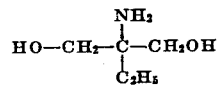

Tris (hydroxymethyl) aminomethane $NH_2C(CH_2OH)_3$

Rearranging such formulas, in an unconventional form designed to show that in each case a single carbon atom separates the amino nitrogen atom from a hydroxymethyl radical, one obtains the following formulas:

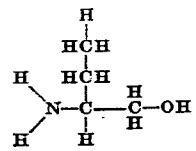

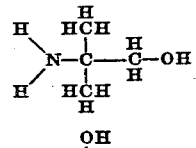

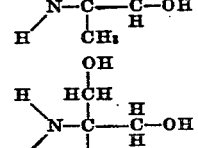

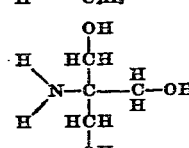

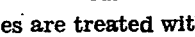

Is such amines are treated with ethylene oxide, so as to convert such primary amines into secondary amines, one obtains compounds of the following type:

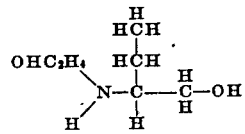

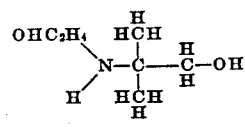

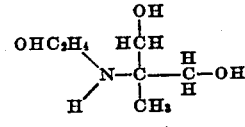

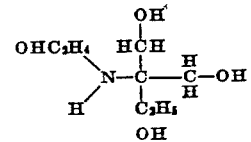

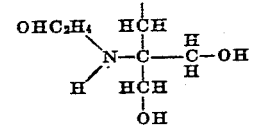

Such primary or secondary amines can readily be converted into the corresponding amide by reaction with a selected monocarboxy detergent-forming acid or the functional equivalent of the acid, such as anhydride, acyl chloride, amide or ester. The procedure employed for the manufacture of such amides is well known. Briefly stated, the reactants are heated at a temperature to permit evolution of water, ammonia, hydrochloric acid, etc., and such reactions are obviously conducted at a point below the decomposition temperature. Employing such procedure, one can readily obtain amides, or better still, substituted amides of the following types:

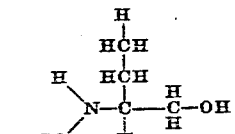

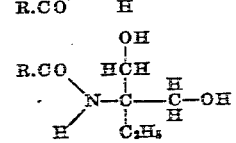

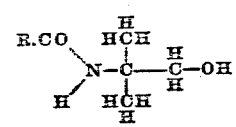

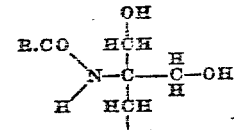

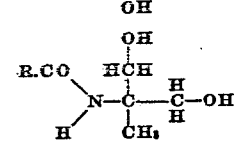

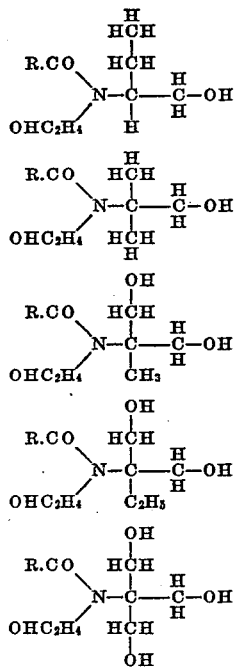

It may be well to point out that where an amide is derived from a primary amine, such amide may be treated under proper conditions with ethylene oxide to yield hydroxyethyl derivatives. Such compounds so obtained are identical with the amides derived by reaction between the acids or their equivalents and the oxyethylated amines of the kind above described.

Although any of the high molal monocarboxy acids can be converted into amides of the kind described, it is our preference to employ amides derived from the higher fatty acids, rather than from petroleum acids, rosin acids, and the like. We have found that by far the most effective demulsifying agents are obtained from unsaturated fatty acids having 18 carbon atoms. Such unsaturated fatty acids include the fatty acids, such as oleic acid, ricinoleic acid, linoleic acid, linolenic acid, etc. One may employ mixed fatty acids, as, for example, the fatty acids obtained from hydrolysis of cottonseed oil, soyabean oil, corn oil, etc. Our preferred demulsifier is obtained from unsaturated fatty acids, and more especially, unsaturated fatty acids containing a hydroxyl radical, or unsaturated fatty acids which have been subjected to an oxidation or oxyalkylation step, such as oxyethylation.

In view of what has been said, and particularly by reference to the aforementioned Haack patent, it will be noted that compounds of the type herein contemplated as demulsifiers, may be indicated by the following formula:

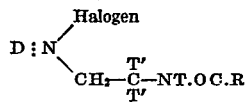

in which T is a member of the class consisting of hydrogen atoms and hydroxyethyl radicals, and T' is a member of the class consisting of hydrogen atoms, methyl radicals, ethyl radicals, and hydroxymethyl radicals, with the proviso that at least one occurrence of T' is a radical of the kind designated as differentiated from a hydrogen atom; RCO is an acyl radical derived from a monocarboxy detergent-forming acid, having at least 8 and not more than 32 carbon atoms; and D:N represents a heterocyclic compound of the pyridine series consisting of pyridine, quinoline, isoquinoline, and C-methyl homologs thereof. The halogen, of course, is most suitably chlorine or bromine; but iodine may be employed except for its excessive cost. More correctly, D:N is contemplated as a radical, rather than a compound.

Compositions of the kind intended to be used as the demulsifying agent in our process, may be exemplified by the following examples.

Example 1

560 g. of a fatty acid amide, obtained by reaction of split cocoanut oil (containing all the natural acids, beginning with the capric up to the stearic acid, and some oleic acid) with tris(hydroxymethyl)aminomethane, 330 g. hydrochloride of a fraction of pyridine bases (50% distilling up to 140° C. 90% distilling up to 160°, completely soluble in water) and 100 g. of the mixture of the free pyridine bases, are heated at 100° C. until the product is, for the most part, soluble in water and stable towards diluted sodium carbonate solution. After being separated from the primary compounds not reacted upon, the mixture of pyriminium-, picolinium- and other homologous pyridinium compounds obtained, may be further worked up to form a 10% watery solution.

When working at 150–160°, the reaction is more rapid.

Furthermore, pure pyridine may be used instead of a mixture of pyridine bases.

(Compare with Example 2 of the aforementioned Haack Patent No. 2,242,211).

Example 2

The substituted ricinoleoamide derived by reaction between ricinoleic acid and tris(hydroxymethyl)aminomethane is substituted for the amide employed in Example 1, preceding.

Example 3

A drastically oxidized castor oil having approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxy number | 188.0 to 220.0 |
| Percent unsaponifiable matter | 1.1 |
| Percent nitrogen | 0.0 |
| Percent SO₃ | 0.0 |
| Percent ash | Trace | is converted into the substituted amide by reaction with tris(hydroxymethyl)aminomethane. Such amide is substituted for the amide employed in Example 1, preceding.

Example 4

One pound mole of castor oil is treated with three pound moles of ethylene oxides in the presence of one-half of 1% of sodium ricinoleate as a catalyst at a temperature of 100–200° C. at a gauge pressure of 100 pounds and less than 300 pounds, so as to produce an oxyethylated triricinolein. An amide derived from such material by reaction with tris(hydroxymethyl)-aminomethane is employed instead of the amide described in Example 1, preceding.

Example 5

Phenylstearic acid is prepared in any suitable manner, as, for example, in the manner described in U. S. Patent No. 2,081,075, dated May 18, 1937, to Vobach. This is converted into an amide by reaction with tris(hydroxymethyl)-aminomethane, and such amide employed in the manner described in Example 1, preceding.

Example 6

In Examples 1 to 5, preceding, the amide derived from 2-amino-1-propanol is used instead of the amide derived from tris(hydroxymethyl)-aminomethane.

Example 7

In Examples 1 to 5, preceding, the amide derived from 2-amino-2-methyl-1-propanol is used instead of the amide derived from tris(hydroxymethyl) aminomethane.

Example 8

In Examples 1 to 5, preceding, the amide derived from 2-amino-2-methyl-1,3-propanediol is used instead of the amide derived from tris-(hydroxymethyl) aminomethane.

Example 9

In Examples 1 to 5, preceding, the amide derived from 2-amino-ethyl-1,3-propanediol is used instead of the amide derived from tris-(hydroxymethyl) aminomethane.

The manufacture of the above compounds is usually conducted with an excess of the pyridinium base halide, such as the hydrochloride, or hydrobromide, and usually in the presence of a significant amount of the free pyridinium base itself. In many instances, however, there is no need to use an excess of the pyridinium base halide, and, in fact, no need to have present any of the free pyridinium base itself, or, at the most, only a trace of the free base.

Sometimes the reaction with the pyridinium compound can be catalyzed by the presence of small amounts of soaps or alkalis. As is obvious, other monovalent anions may replace the halogen and serve as a functional equivalent.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oils, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well or at some point prior to the emergence of said well fluids. This particular type of application is decidedly feasible when the demulsifier is used in connection with acidification of calcareous oil-bearing strata, especially if suspended in or dissolved in the acid employed for acidification.

Attention is directed to our co-pending application for patent, Serial No. 401,375, filed July 7, 1941, which subsequently matured as U. S. Patent No. 2,273,181, dated February 17, 1942, to De Groote and Keiser. Said co-pending application contemplates resolution of petroleum emulsions of the water-in-oil type by means of demulsifiers of the following formula type:

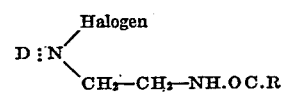

in which the acyl radical RCO is derived from a monocarboxy detergent-forming acid having at least 8 carbon atoms and not more than 32 carbon atoms; and D:N represents a heterocyclic compound of the pyridine series consisting of pyridine, quinoline, isoquinoline, and C-methyl homologs thereof. The halogen, of course, is most suitably chlorine or bromine; but iodine may be employed except for its excessive cost. More correctly, D:N is contemplated as a radical, rather than a compound.

Attention is also directed to our co-pending applications, filed the same date as the instant application, and bearing the following serial numbers: 415,763, 415,765 and 415,766.

Having thus described our invention, what we claim as new and desire to secure by Letters Patent is:

1. A process for breaking petroleum emulsions of the water-in-oil type, which consists in subjecting the emulsion to the action of a demulsifier comprising a chemical compound of the following formula:

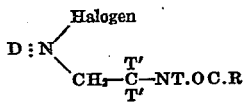

in which T is a member of the class consisting of hydrogen atoms and hydroxyethyl radicals, and T' is a member of the class consisting of methyl radicals, ethyl radicals, and hydroxymethyl radicals, with the proviso that at least one occurrence of T' is a radical of the kind designated, and differentiated from a hydrogen atom; RCO is an acyl radical derived from a monocarboxy detergent-forming acid having at least 8 and not more than 32 carbon atoms; and D:N represents a radical of a heterocyclic compound of the pyridine series consisting of pyridine, quinoline, isoquinoline, and C-linked methyl homologues thereof.

2. A process for breaking petroleum emulsions of the water-in-oil type, which consists in subjecting the emulsion to the action of a demulsifier comprising a chemical compound of the following formula:

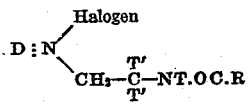

in which T is a member of the class consisting of hydrogen atoms and hydroxyethyl radicals, and T' is a member of the class consisting of methyl radicals, ethyl radicals, and hydroxymethyl radicals, with the proviso that at least one occurrence of T' is a radical of the kind designated, and differentiated from a hydrogen atom; RCO is an acyl radical derived from a higher fatty acid having at least 8 and not more than 32 carbon atoms; and D:N represents a radical of a heterocyclic compound of the pyridine series consisting of pyridine, quinoline, isoquinoline, and C-linked methyl homologues thereof.

3. A process for breaking petroleum emulsions of the water-in-oil type, which consists in subjecting the emulsion to the action of a demulsifier comprising a chemical compound of the following formula:

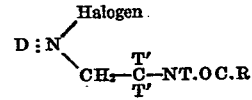

in which T is a member of the class consisting of hydrogen atoms and hydroxyethyl radicals, and T' is a member of the class consisting of methyl radicals, ethyl radicals, and hydroxymethyl radicals, with the proviso that at least one occurrence of T' is a radical of the kind designated, and differentiated from a hydrogen atom; RCO is an acyl radical derived from unsaturated higher fatty acid having at least 8 and not more than 32 carbon atoms; and D:N represents a radical of a heterocyclic compound of the pyridine series consisting of pyridine, quinoline, isoquinoline, and C-linked methyl homologues thereof.

4. A process for breaking petroleum emulsions of the water-in-oil type, which consists in subjecting the emulsion to the action of a demulsifier comprising a chemical compound of the following formula:

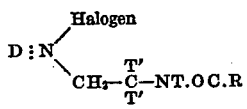

in which T is a member of the class consisting of hydrogen atoms and hydroxyethyl radicals, and T' is a member of the class consisting of methyl radicals, ethyl radicals, and hydroxymethyl radicals, with the proviso that at least one occurrence of T' is a radical of the kind designated, and differentiated from a hydrogen atom; RCO is a ricinoleyl radical; and D:N represents a radical of a heterocyclic compound of the pyridine series consisting of pyridine, quinoline, isoquinoline, and C-linked methyl homologues thereof.

5. A process for breaking petroleum emulsions of the water-in-oil type, which consists in subjecting the emulsion to the action of a demulsifier comprising a chemical compound of the following formula:

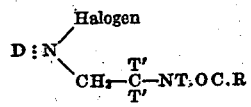

in which T is a member of the class consisting of hydrogen atoms and hydroxyethyl radicals, and T' is a member of the class consisting of methyl radicals, ethyl radicals, and hydroxymethyl radicals, with the proviso that at least one occurrence of T' is a radical of the kind designated, and differentiated from a hydrogen atom; RCO is an oleyl radical; and D:N represents a radical of a heterocyclic compound of the pyridine series consisting of pyridine, quinoline, isoquinoline, and C-linked methyl homologues thereof.

6. A process for breaking petroleum emulsions of the water-in-oil type, which consists in subjecting the emulsion to the action of a demulsifier comprising a chemical compound of the following formula:

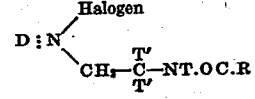

in which T is a member of the class consisting of hydrogen atoms and hydroxyethyl radicals, and T' is a member of the class consisting of methyl radicals, ethyl radicals, and hydroxymethyl radicals, with the proviso that at least one occurrence of T' is a radical of the kind designated, and differentiated from a hydrogen atom; RCO is a linoleyl radical; and D:N represents a radical of a heterocyclic compound of the pyridine series consisting of pyridine, quinoline, isoquinoline, and C-linked methyl homologues thereof.

MELVIN DE GROOTE.
BERNHARD KEISER.